（12) United States Patent
Yang

(10) Patent No.: US 11,846,239 B2
(45) Date of Patent: Dec. 19, 2023

(54) AIR SUPPLY DEVICE FOR AN ELECTRICALLY HEATED CATALYST AND A METHOD FOR CONTROLLING THE SAME

(71) Applicants: HYUNDAI MOTOR COMPANY, Seoul (KR); KIA CORPORATION, Seoul (KR)

(72) Inventor: Il Suk Yang, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/993,125

(22) Filed: Nov. 23, 2022

(65) Prior Publication Data
US 2023/0184188 A1 Jun. 15, 2023

(30) Foreign Application Priority Data
Dec. 10, 2021 (KR) .......................... 10-2021-0176451

(51) Int. Cl.
| F02D 41/02 | (2006.01) |
| F01N 3/32 | (2006.01) |
| F01N 3/20 | (2006.01) |
| F02D 13/02 | (2006.01) |
| F02B 39/10 | (2006.01) |
| F02D 41/00 | (2006.01) |

(52) U.S. Cl.
CPC ......... *F02D 41/024* (2013.01); *F01N 3/2013* (2013.01); *F01N 3/323* (2013.01); *F02B 39/10* (2013.01); *F02D 13/0234* (2013.01); *F02D 41/0007* (2013.01); *F02D 2041/001* (2013.01); *F02D 2200/70* (2013.01)

(58) Field of Classification Search
CPC .............. F02D 41/024; F02D 13/0234; F02D 41/0007; F02D 2041/001; F02D 2200/70; F01N 3/2013; F01N 3/323; F02B 39/10
USPC ........................................................... 60/320
See application file for complete search history.

(56) References Cited

U.S. PATENT DOCUMENTS

| 10,301,991 | B1 * | 5/2019 | Dudar ................. F02M 35/1038 |
| 11,519,313 | B1 * | 12/2022 | Martz ........................ F01N 3/22 |
| 2022/0010742 | A1 * | 1/2022 | Cox ..................... F02N 11/0829 |
| 2023/0059437 | A1 * | 2/2023 | Yang ........................ F01N 3/225 |

FOREIGN PATENT DOCUMENTS

KR 19980040198 U 9/1998

\* cited by examiner

*Primary Examiner* — J. Todd Newton
(74) *Attorney, Agent, or Firm* — LEMPIA SUMMERFIELD KATZ LLC

(57) ABSTRACT

An air supply device for an electrically heated catalyst is proposed. The device includes an electronic supercharger fluidly connected to an intake manifold, an intake valve fluidly connected to the electronic supercharger, an exhaust valve fluidly connected to an exhaust manifold of the engine, an electrically heated catalyst fluidly connected to the exhaust manifold and positioned in a front end of a catalyst part, and a controller configured to control driving of the electronic supercharger and an opening degree of each of the intake valve and the exhaust valve. The controller controls the electronic supercharger based on a door opening condition in a cold operation and switches the intake valve to an advance state and the exhaust valve to a retard state, thus heating the electrically heated catalyst.

10 Claims, 3 Drawing Sheets

AIR SUPPLY DEVICE FOR AN ELECTRICALLY HEATED CATALYST AND A METHOD FOR CONTROLLING THE SAME

CROSS REFERENCE TO RELATED APPLICATION

The present application claims priority to Korean Patent Application No. 10-2021-0176451, filed Dec. 10, 2021, the entire contents of which are incorporated herein by reference.

FIELD

The present disclosure relates to an air supply device for an electrically heated catalyst and a method for controlling the same. More particularly, the present disclosure relates to an air supply device and method for an electrically heated catalyst, in which fresh air required for driving the electrically heated catalyst can flow to the electrically heated catalyst via an intake manifold and an engine.

BACKGROUND

The statements in this section merely provide background information related to the present disclosure and may not constitute prior art.

Recently, as vehicle performance as well as fuel efficiency and environmental pollution problems have been highlighted, regulations on exhaust-gas emissions are being strengthened. With the development of engine technology for emission control and fuel efficiency improvement, a method for activating a catalyst system has been proposed.

In such a catalyst system, a method of increasing the amount of noble metal and an additional engine control strategy for increasing an exhaust temperature are used to improve the purification activity of the catalyst system.

However, an increase in amount of noble metal undesirably leads to an increase in cost and deterioration in fuel efficiency.

In addition, as a method of increasing the exhaust temperature through engine control, a method of activating a catalyst by transferring heat combusted through the post-injection of fuel to the catalyst was used. However, in this method, exhaust energy for increasing the exhaust temperature was transferred to the catalyst by 30% or less. This is problematic in that efficiency is lowered due to a large loss of energy. As the fuel is post-injected, the fuel efficiency is adversely affected.

An electrically heated catalyst technology has been proposed as a method to solve the above problem. The electrically heated catalyst technology rapidly activates the catalyst with heat generated by applying electric power to the catalyst, thus improving the performance of purifying exhaust gas emitted from the engine. However, such a device is problematic in that this uses the power source of a battery and uses the power of up to 90 A, so the more frequently the device is used, the more rapidly the battery consumption increases, which may put a lot of strain on an alternator for charging the battery.

That is, if power is always supplied to operate the electrically heated catalyst, active performance may be good during low-speed driving and frequent ignition on/off. However, the battery consumes a lot of power, so it puts a lot of strain on the alternator, resulting in deterioration of fuel efficiency.

Furthermore, in order to maximize the operating efficiency of the electrically heated catalyst, a heated-air convection method is used to supply fresh air. Accordingly, it is required to control the operation of an intake valve and an exhaust valve of the engine to supply fresh air into the electrically heated catalyst.

SUMMARY OF THE PRESENT DISCLOSURE

The present disclosure provides a control device and a method for supplying fresh air to an electrically heated catalyst via an engine in a cold condition before the engine of a vehicle is started.

Further, an objective of the present disclosure is to provide an air supply device and a method, by which air can be supplied to an electrically heated catalyst by controlling a valve of an engine in a state where a separate 48-volt power system for improving exhaust-gas purification performance is not applied.

Furthermore, the present disclosure is to provide a method for controlling an intake valve and an exhaust valve so that fresh air can flow to an electrically heated catalyst.

The present disclosure is not limited to the above-mentioned objective. Other objectives of the present disclosure should be clearly understood by those having ordinary skill in the art from the following description. In addition, the objectives of the present disclosure can be realized by means and combinations thereof defined in the claims.

An air supply device for an electrically heated catalyst intended to achieve the above-described objectives of the present disclosure includes the following configuration.

The present disclosure provides an air supply device for an electrically heated catalyst. The device includes: an electronic supercharger configured to be fluidly connected to an intake manifold of an engine; and an intake valve of the engine. The intake valve is fluidly connected to the electronic supercharger. The device further includes: an exhaust valve fluidly connected to an exhaust manifold of the engine; an electrically heated catalyst fluidly connected to the exhaust manifold and positioned in upstream of a catalyst part; and a controller configured to control driving of the electronic supercharger and an opening degree of each of the intake valve and the exhaust valve. In particular, the controller controls to drive the electronic supercharger based on a door opening condition in a cold operation, and to switch the intake valve to an advance state and switch the exhaust valve to a retard state, thus heating the electrically heated catalyst.

The controller may determine that a vehicle is under a cold condition, when an ambient temperature of the vehicle is less than 0° C.

The controller may be configured to switch the intake valve of an intake-stroke preparation cylinder of the engine to an advance state and to switch the exhaust valve of the intake-stroke preparation cylinder of the engine to a retard state.

The controller may control to drive the electronic supercharger, switch the intake valve to the advance state, and switch the exhaust valve to the retard state, when the door opening condition is satisfied and then the vehicle is not started.

Furthermore, the present disclosure provides an air supply method for an electrically heated catalyst. The method includes: determining, by a controller, a cold condition when a door of a vehicle is opened; determining, by the controller, whether a request to start an engine is applied under the cold condition; and switching, by the controller, the electrically heated catalyst to a driving state when the request to start the engine is not applied under the cold condition. The method further comprises: switching, by the controller, driving of the electrically heated catalyst to an off state when a driving state of the electrically heated catalyst is maintained for a time longer than a set time; and determining whether the request to start the engine is applied when the driving state of the electrically heated catalyst is maintained for a time shorter than the set time.

The switching the electrically heated catalyst to the driving state may further include, by the controller, applying power to the electrically heated catalyst, driving an electronic supercharger, switching the intake valve to an advance state, and switching the exhaust valve to a retard state.

The controller may be configured to switch the intake valve of an intake-stroke preparation cylinder of the engine to an advance state and to switch the exhaust valve of the intake-stroke preparation cylinder of the engine to a retard state.

The cold condition may include a case where the ambient temperature of the vehicle is less than 0° C.

The switching, by the controller, driving of the electrically heated catalyst to the off state when the driving state of the electrically heated catalyst is maintained for the time longer than the set time may further include switching the electronic supercharger to an off state, and switching the intake valve and the exhaust valve to a set position.

The determining, by the controller, whether the request to start the engine is applied under the cold condition may further include switching an electronic throttle, the intake valve, and the exhaust valve to a set position, and switching driving of the electronic supercharger to an off state, when the request to start the engine is applied.

The present disclosure can obtain the following effects by the configuration, combination, and use relationship, which are described below along with the present embodiment.

The present disclosure is advantageous in that it provides a control device capable of providing fresh air when an electrically heated catalyst is operated, thus maximizing the efficiency of a catalyst heating system.

Further, the present disclosure is advantageous in that a flow path can be formed so that fresh air flows to an electrically heated catalyst by controlling intake and exhaust valves of an engine, thus maximizing the efficiency of a catalyst heating system without adding components.

Furthermore, the present disclosure is advantageous in that it is configured to supply air to an electrically heated catalyst without additional components of a 48-volt power supply system, thus reducing cost.

BRIEF DESCRIPTION OF THE DRAWINGS

The above and other objectives, features, and other advantages of the present disclosure should be more clearly understood from the following detailed description when taken conjointly with the accompanying drawings, in which.

DETAILED DESCRIPTION

Figure 1:
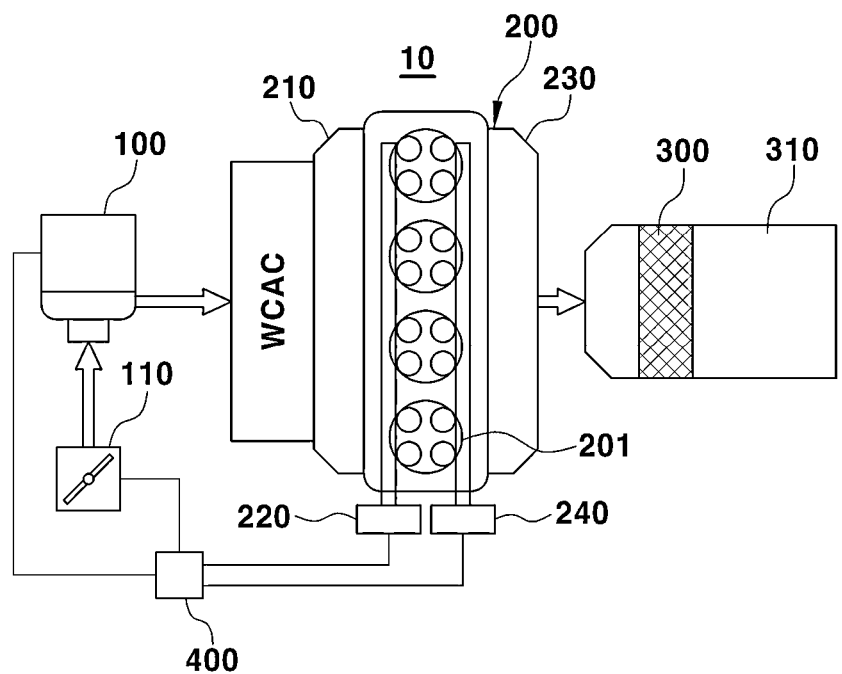
FIG. 1 is a configuration view of an air supply device for an electrically heated catalyst according to an embodiment of the present disclosure.

Hereinafter, embodiments of the present disclosure are described in detail with reference to the accompanying drawings. The embodiments of the present disclosure may be modified in various forms, and the scope of the present disclosure should not be construed as being limited to the following embodiments. The embodiments are provided to make those of ordinary skill in the art more completely understand the present disclosure.

Further, the terms "part", "unit", "module", etc. described in the specification mean a unit that processes at least one function or operation, which may be implemented in hardware, software or a combination of hardware and software.

The terminology used herein is for the purpose of describing particular embodiments only and is not intended to be limiting. In the present disclosure, the singular forms are intended to include the plural forms as well, unless the context clearly indicates otherwise.

It should be understood that, although the terms "first", "second", etc. may be used herein to describe various elements, these elements should not be limited by these terms. These terms are only used to distinguish one element from another element. When a component, device, element, or the like of the present disclosure is described as having a purpose or performing an operation, function, or the like, the component, device, or element should be considered herein as being "configured to" meet that purpose or to perform that operation or function.

Herein, various embodiments may be implemented as software (e.g., a program) including commands stored in a machine-readable storage medium (e.g., a computer). A device is a device that may call a stored command from the storage medium and operate according to the called command, and may include an electronic device (e.g., a server, a control unit) according to the disclosed embodiments. Instructions may include a code generated or executed by a compiler or an interpreter. A device-readable storage medium may be provided in the form of a non-transitory storage medium. Here, the term "non-transitory" means that the storage medium does not include a signal and is tangible, and does not distinguish between semi-permanent or temporary storage of data in the storage medium.

In this specification, the term "set position" or "start position" may mean an uncontrolled initial state or a state in which a valve is set to be positioned when an engine 200 is not driven or an operating state of a configuration.

Hereinafter, the present disclosure is described in detail with reference to the accompanying drawings. The same reference numerals are used throughout the drawings to designate the same or similar components.

FIG. 1 illustrates the configuration of an air supply device 10 for an electrically heated catalyst 300 according to an embodiment of the present disclosure.

As illustrated in FIG. 1, the engine 200 includes an intake manifold 210, a cylinder 201, and an exhaust manifold 230. In one embodiment, a catalyst part 310 is fluidly connected to the exhaust manifold 230, and the electrically heated catalyst 300 may be provided on upstream of the catalyst part 310.

In the present disclosure, the electrically heated catalyst (EHC) 300 is a device that is installed in an exhaust line of a vehicle. The electrically heated catalyst (EHC) 300 increases the temperature of exhaust gas to activate a catalyst system and thus rapidly activates the catalyst. When the electrically heated catalyst 300 is supplied with electric power from a battery mounted on the vehicle or fastened to the electrically heated catalyst 300, a heating part generates heat at high temperature. The generated heat passes through the catalyst part (three-way catalyst: TWC) 310 installed right behind the electrically heated catalyst together with an exhaust flow, so conduction and radiant heat are transferred to noble metal and thereby the catalyst is activated. Further, the catalyst part 310 may be configured to transfer heat from the electrically heated catalyst 300 through convection. A catalyst filter (particulate filter: PF) may be installed at the rear of the catalyst part 310 to reduce particulate matter in the exhaust gas.

Furthermore, since the electrically heated catalyst 300 of the present disclosure is configured such that the generated heat is introduced into the entire catalyst in an air convection manner by the fresh air introduced through the exhaust manifold 230 of the engine 200, the entire catalyst part 310 may be heated.

The intake manifold 210 positioned at the front end of the engine 200 may be configured to be fluidly connected to an electronic supercharger 100, and the intake manifold 210 may be engaged with an electronic throttle 110 to control the pressure and flow rate of the introduced fresh air.

The electronic supercharger 100 may be configured such that the amount of rotation may be controlled by a controller 400, and the opening degree of the electronic throttle 110 may also be controlled by the controller 400.

Further, the engine 200 disclosed in the present disclosure may refer to the engine 200 including a Continuous Variable Valve Timing (CVVT) system, and thus the engine 200 is configured to electrically control the advance and retard of the intake valve 220 and the exhaust valve 240 provided for the cylinder 201 of the engine 200. Furthermore, the intake valve 220 and the exhaust valve 240 positioned in each of a plurality of cylinders 201 may be independently controlled by the controller 400.

In the case of the engine 200 including the CCVT system, the opening degree and the opening timing of the intake valve 220 and the exhaust valve 240 fastened to each engine cylinder 201 may be controlled by the controller 400. Furthermore, the controller 400 may determine the stroke position of each cylinder 201. Thus, the controller 400 of the present disclosure may be configured to switch the intake valve 220 of an intake-stroke preparation cylinder 201 (i.e., a cylinder 201 in a process of intake-stroke) to an advance state and switch the exhaust valve 240 to a retard state.

When the intake valve 220 is switched to the advance state and the exhaust valve 240 is switched to the retard state, an overlap zone (i.e., valve overlap zone in FIG. 3) in which the intake valve 220 and the exhaust valve 240 are simultaneously opened may be included. The fresh air introduced from the intake manifold 210 flows through the intake valve 220 into the exhaust valve 240 and then the electrically heated catalyst 300.

The controller 400 of the present disclosure may be an integrated controller 400 of the vehicle, and may include the controller 400 of the engine 200. Furthermore, the integrated controller 400 may be configured to control the electronic supercharger 100, the intake valve 220, the exhaust valve 240, the electrically heated catalyst 300, and the electronic throttle 110. Further, the controller 400 is configured to conduct electricity with an ambient temperature sensor (not shown) that measures the ambient temperature of the vehicle, and thus may receive the ambient temperature of the vehicle.

As described above, the controller 400 may determine the position of a piston of each cylinder 201 of the engine 200, and may control the opening degree of the intake valve 220 and the exhaust valve 240 fastened to a corresponding cylinder 201 depending on the position of the piston.

Furthermore, when it is determined that a door of the vehicle is opened and the ambient temperature condition of the vehicle is less than a set temperature, the controller 400 is configured to apply power to the electrically heated catalyst 300, and controls to introduce fresh air into the intake manifold 210 by opening the electronic supercharger 100 and the electronic throttle 110. Furthermore, the controller controls such that the intake valve 220 of the intake-stroke preparation cylinder 201 of the engine 200 is switched to the advance state and the exhaust valve 240 is switched to the retard state, thus forming the overlap zone in which the intake valve 220 and the exhaust valve 240 are simultaneously opened. As such, the controller 400 provides fresh air introduced into the catalyst part 310 while the electrically heated catalyst 300 is heated, and increases the effect of increasing the temperature of the entire catalyst part 310 via the electrically heated catalyst 300.

Further, when the vehicle is switched to the ignition-on state or when the electrically heated catalyst 300 is heated for a time longer than a set time, the controller 400 is configured to stop the operation of the electronic supercharger 100, return the opening of the electronic throttle 110 to the start position, and switch the intake valve 220 and the exhaust valve 240, which have been controlled, to a neutral state. That is, when the engine 200 is started, the required amount of air may be introduced into the electrically heated catalyst 300 and the catalyst part 310 through the driving of the engine 200.

Figure 2:
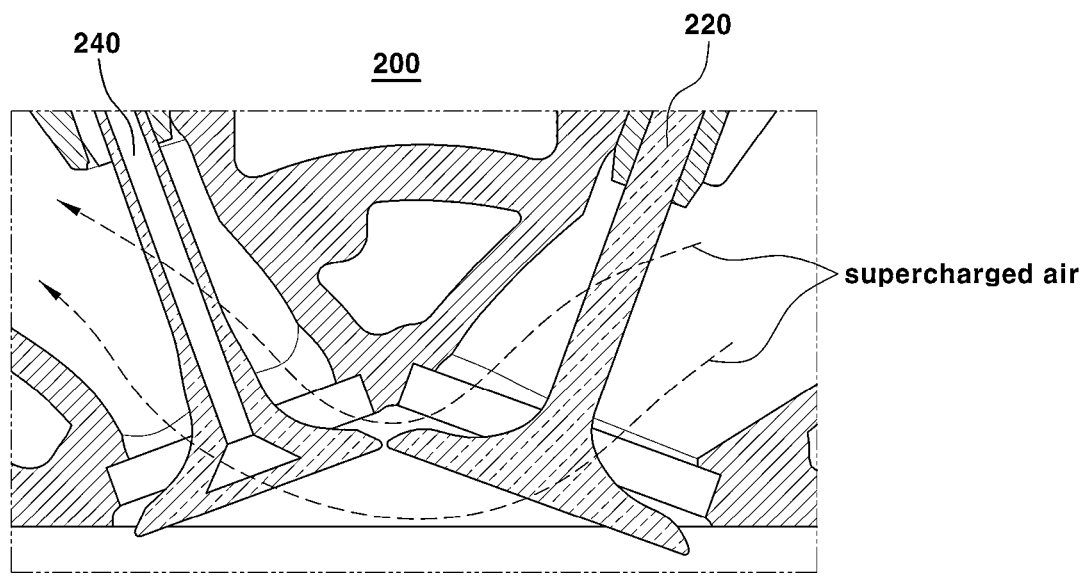
FIG. 2 is an enlarged view illustrating the flow of fresh air in the air supply device for the electrically heated catalyst according to an embodiment of the present disclosure.
Figure 3:
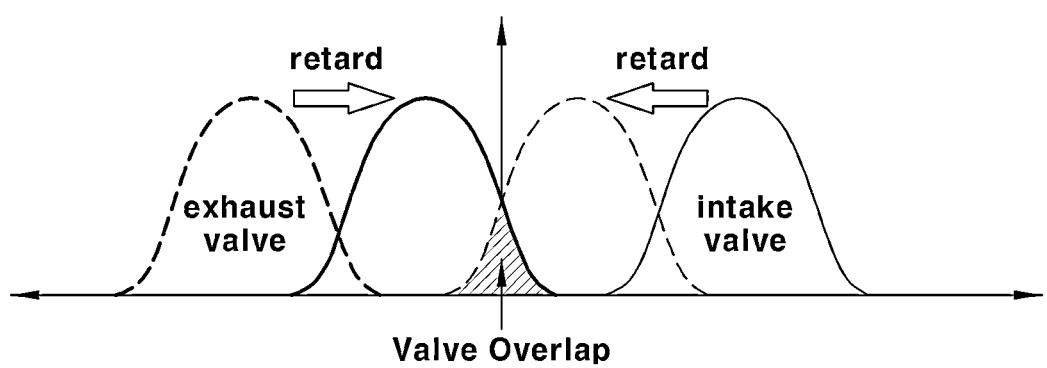
FIG. 3 is a diagram illustrating a control point between an intake valve and an exhaust valve so that fresh air is introduced according to an embodiment of the present disclosure.

FIG. 2 is an enlarged view of the cylinder 201 of the engine 200 in which the intake valve 220 and the exhaust valve 240 have the overlap zone, according to an embodiment of the present disclosure, and FIG. 3 illustrates valve timing control in which the intake valve 220 and the exhaust valve 240 form the overlap zone.

As shown in FIG. 2, according to the present disclosure, when the door of the vehicle is opened and it is determined that the vehicle is in a cold state, the controller 400 is configured to apply power to the electrically heated catalyst 300. Furthermore, the intake valve 220 and the exhaust valve 240 positioned in at least one cylinder 201 of the engine 200 are fluidly connected to each other to introduce the fresh air to the electrically heated catalyst 300. Further, the opening degree of the electronic throttle 110 positioned at the upstream of the intake manifold 210 is increased and the rotation of the electronic supercharger 100 is performed, thus increasing the flow rate of the fresh air introduced into the intake valve 220.

In this way, the fresh air introduced into the intake manifold 210 is discharged via the intake valve 220 to the exhaust valve 240, and the respective valves are controlled such that the intake valve 220 is switched to the advance state and the exhaust valve 240 is switched to the retard state.

As shown in the drawings, when the intake valve 220 is switched to the advance state and the exhaust valve 240 is switched to the retard state, the fresh air introduced through the intake manifold 210 flows through the intake valve 220 into the cylinder 201, and flows through the exhaust valve 240, which is controlled to be opened by a predetermined degree, to the electrically heated catalyst 300.

In other words, when the intake valve 220 is switched to the advance state and the exhaust valve 240 is switched to the retard state, the intake valve 220 and the exhaust valve 240 have the overlap zone formed to simultaneously have a predetermined opening degree. The fresh air introduced from the electronic supercharger 100 flows through the exhaust manifold 230 to the electrically heated catalyst 300 and the catalyst part 310 in the overlap zone of the cylinder 201 of the engine 200.

As shown in FIG. 3, the controller 400 performs control to switch the intake valve 220 of the intake-stroke preparation cylinder 201 to the advance state and switch the exhaust valve 240 to the retard state. In other words, the advance-controlled intake valve 220 and the retard-controlled exhaust valve 240 may simultaneously maintain a partially opened state in the overlap zone.

The intake valve 220 and the exhaust valve 240 that are opened as such are fluidly connected to each other. Simultaneously, the controller 400 controls the electronic supercharger 100 and the electronic throttle 110 so that the fresh air is introduced into the intake manifold 210 and the introduced fresh air flows through the intake valve 220 to the exhaust valve 240.

In another embodiment, the controller 400 is configured to control the intake valve 220 and the exhaust valve 240 of the intake-stroke preparation cylinder 201. In particular, the controller 400 is configured to control the intake valve 220 and the exhaust valve 240 of at least one cylinder 201 in the overlap zone in response to the flow rate of 270 kg/h from the supercharger to the intake manifold 210 so as to perform the convection flow of the electrically heated catalyst 300. In other words, in order to provide the flow rate of 20 Kg/h required for the convection flow to the electrically heated catalyst 300, the controller is configured to control the intake valve 220 and the exhaust valve 240 of at least one cylinder 201 that performs the intake-stroke preparation.

Thus, when the vehicle door is opened and the vehicle is cooled, the electrically heated catalyst 300 is heated and the electronic supercharger 100 and the electronic throttle 110 are opened to introduce fresh air into the engine 200. Furthermore, each valve is controlled such that the fresh air introduced into the engine 200 flows through the intake valve 220 to the exhaust valve 240. Thus, heat is controlled to flow through a heating element of the electrically heated catalyst 300 to the entire catalyst part 310 in a convection method.

Figure 4:
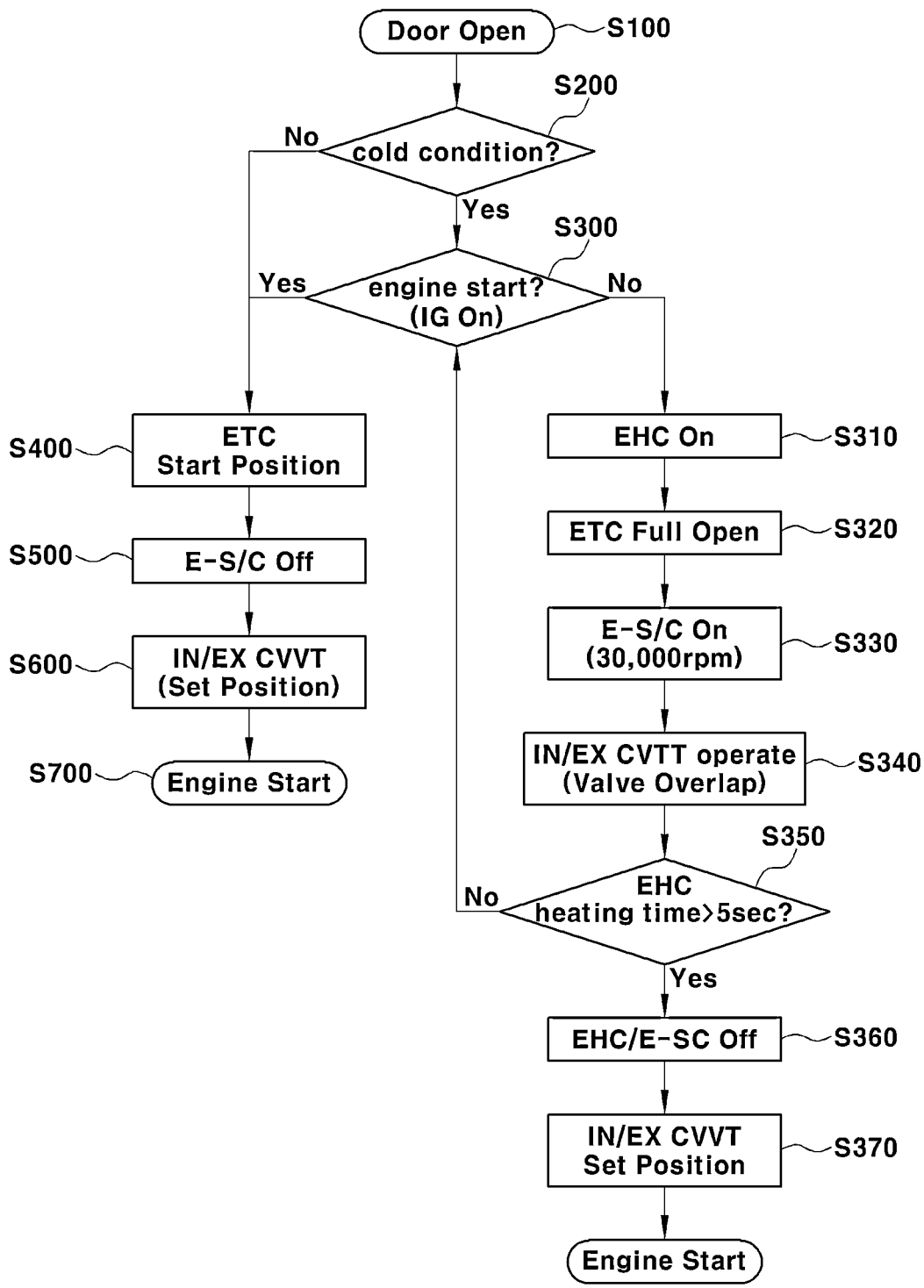
FIG. 4 is a flowchart illustrating an air supply method for an electrically heated catalyst according to an embodiment of the present disclosure.

FIG. 4 is a flowchart illustrating a control method for the electrically heated catalyst 300 according to an embodiment of the present disclosure.

When the door of the vehicle is opened in the ignition-off state of the vehicle (S100), it is determined through the ambient temperature sensor whether the vehicle is under the cold condition (S200). In an embodiment of the present disclosure, when it is determined whether the vehicle is under the cold condition, the controller 400 determines whether the ambient temperature received from the ambient temperature sensor is less than a set point. In an embodiment of the present disclosure, a case where the ambient temperature is less than 0° C. may be set as the cold condition (S200).

When it is determined by the controller 400 that the vehicle is under the cold condition, it is determined whether the engine 200 is started (S300). When the ignition-off of the engine 200 is maintained, power is applied to the electrically heated catalyst 300 (S310), and the opening degree of the electronic throttle 110 is switched to the maximum state (S320). Furthermore, the electronic supercharger 100 is configured to perform driving (S330). Simultaneously, the controller 400 switches the intake valve 220 of at least one cylinder 201 to the advance state, and switches the exhaust valve 240 to the retard state (S340). The cylinder 201 in which the intake valve 220 and the exhaust valve 240 are controlled may be set as the intake-stroke preparation cylinder.

On the other hand, when it is determined by the controller 400 that the vehicle is under the cold condition, and a request to start the engine 200 is applied (S300), the electronic throttle 110 is switched to the set position (S400), and the driving of the electronic supercharger 100 is terminated (S500). In addition, the intake valve 220 and the exhaust valve 240 of the engine 200 are controlled according to the driving of the engine 200 (S600). Subsequently, the driving of the engine 200 is executed (S700). When the request to start the engine 200 is not applied (S300), the controller 400 determines whether power applied to the electrically heated catalyst 300 is applied for a time longer than a set time (S350). When power is applied to the electrically heated catalyst 300 for a time longer than the set time, the driving of the electrically heated catalyst 300 and the driving of the electronic supercharger 100 are terminated (S360), and the control of the intake valve 220 and the exhaust valve 240 is terminated (changed to the set position) (S370). In an embodiment of the present disclosure, a set time compared with a time when power is applied to the electrically heated catalyst 300 may be set to 5 seconds. Furthermore, if the time when power is applied to the electrically heated catalyst 300 is less than the set time (S350), a step (S300) of determining whether a request to start the engine 200 is applied is performed.

Although the present disclosure was described with reference to specific embodiments shown in the drawings, it is apparent to those having ordinary skill in the art that the present disclosure may be changed and modified in various ways without departing from the scope of the present disclosure.

What is claimed is:

1. An air supply device for an electrically heated catalyst, the device comprising:
   an electronic supercharger configured to be fluidly connected to an intake manifold of an engine;
   an intake valve fluidly connected to the electronic supercharger;
   an exhaust valve fluidly connected to an exhaust manifold of the engine;
   an electrically heated catalyst fluidly connected to the exhaust manifold and positioned upstream of a catalyst part; and
   a controller configured to control an opening degree of each of the intake valve and the exhaust valve of the engine,
   wherein the controller is further configured to:
      control an operation of the electronic supercharger based on a cold condition when a door of a vehicle is opened,
      switch the intake valve to an advance state and the exhaust valve to a retard state so as to heat the electrically heated catalyst, and
      switch driving of the electrically heated catalyst to an off state when a driving state of the electrically heated catalyst is maintained for a time longer than a predetermined time.

2. The air supply device of claim 1, wherein the controller is configured to determine that the vehicle is under a cold condition when an ambient temperature of the vehicle is less than 0° C.

3. The air supply device of claim 1, wherein the controller is configured to switch the intake valve of an intake-stroke preparation cylinder of the engine to the advance state and configured to switch the exhaust valve of the intake-stroke preparation cylinder of the engine to the retard state.

4. The air supply device of claim 1, wherein the controller is configured to control to drive the electronic supercharger, switch the intake valve to the advance state, and switch the exhaust valve to the retard state, when the door is opened and then the vehicle is not started.

5. An air supply method for an electrically heated catalyst, the method comprising:
- determining, by a controller, a cold condition when a door of a vehicle is opened;
- determining, by the controller, whether a request to start an engine is applied under the cold condition;
- switching, by the controller, the electrically heated catalyst to a driving state when the request to start the engine is not applied under the cold condition;
- switching, by the controller driving of the electrically heated catalyst to an off state when a driving state of the electrically heated catalyst is maintained for a time longer than a set time; and
- determining, by the controller, whether the request to start the engine is applied when the driving state of the electrically heated catalyst is maintained for a time shorter than the set time.

6. The air supply method of claim 5, wherein switching the electrically heated catalyst to the driving state comprises:
- applying, by the controller, power to the electrically heated catalyst,
- driving an electronic supercharger,
- switching an intake valve to an advance state, and
- switching an exhaust valve to a retard state.

7. The air supply method of claim 6, further comprising:
- switching, by the controller, the intake valve of an intake-stroke preparation cylinder of the engine to an advance state, and
- switching, by the controller, the exhaust valve of the intake-stroke preparation cylinder of the engine to a retard state.

8. The air supply method of claim 5, wherein the cold condition comprises a case where an ambient temperature of the vehicle is less than 0° C.

9. The air supply method of claim 5, wherein switching the driving of the electrically heated catalyst to the off state comprises:
- switching an electronic supercharger to an off state, and
- switching an intake valve and an exhaust valve to a set position.

10. The air supply method of claim 5, wherein determining whether the request to start the engine is applied under the cold condition comprises:
- switching an electronic throttle, an intake valve, and an exhaust valve to a set position, and
- switching driving of an electronic supercharger to an off state when the request to start the engine is applied.

* * * * *